Figure 8:
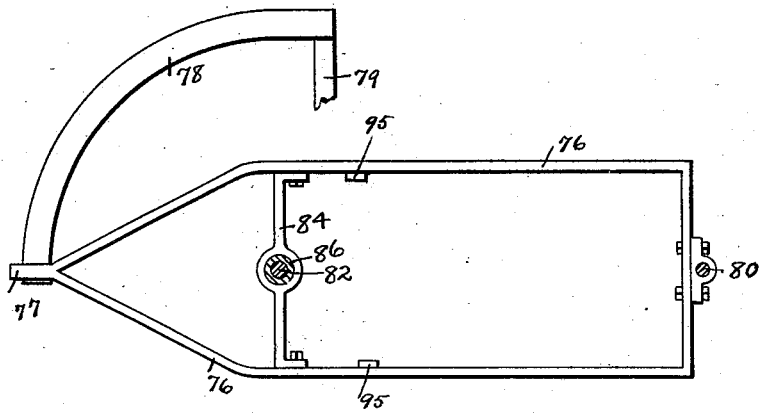

(No Model.) 5 Sheets—Sheet 1.
G. W. & C. E. GOSS.
HEDGE TRIMMING MACHINE.
No. 508,936. Patented Nov. 21, 1893.
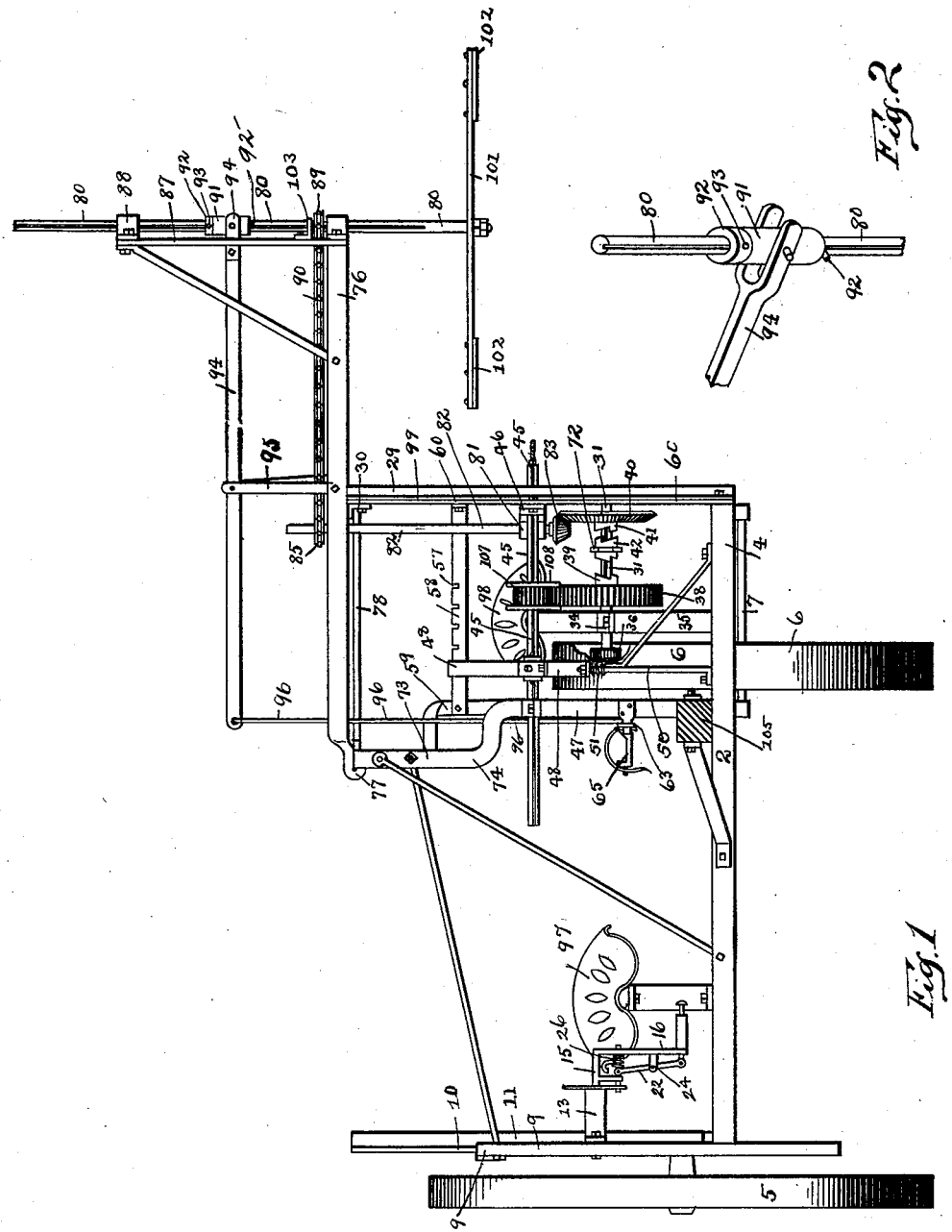
WITNESSES:
J. B. Bradshaw
A. L. Phelps
INVENTORS
George W. Goss
Charles E. Goss
BY
Staley and Shepherd
ATTORNEYS (No Model.) 5 Sheets—Sheet 2.
G. W. & C. E. GOSS.
HEDGE TRIMMING MACHINE.
No. 508,936. Patented Nov. 21, 1893.
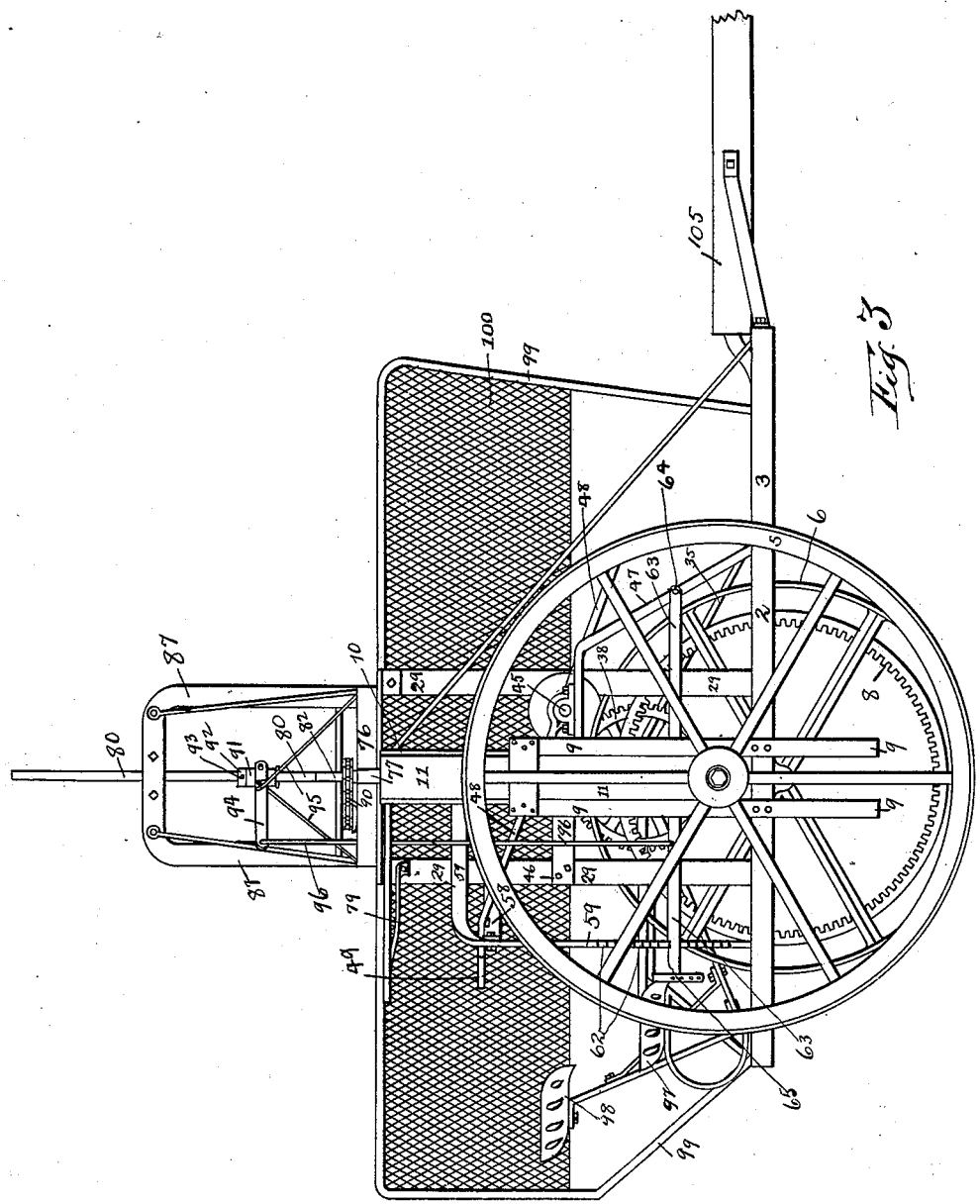
WITNESSES:
H. B. Bradshaw
A. L. Phelps
INVENTORS
George W. Goss
Charles E. Goss
BY
Staley and Shepherd
ATTORNEYS

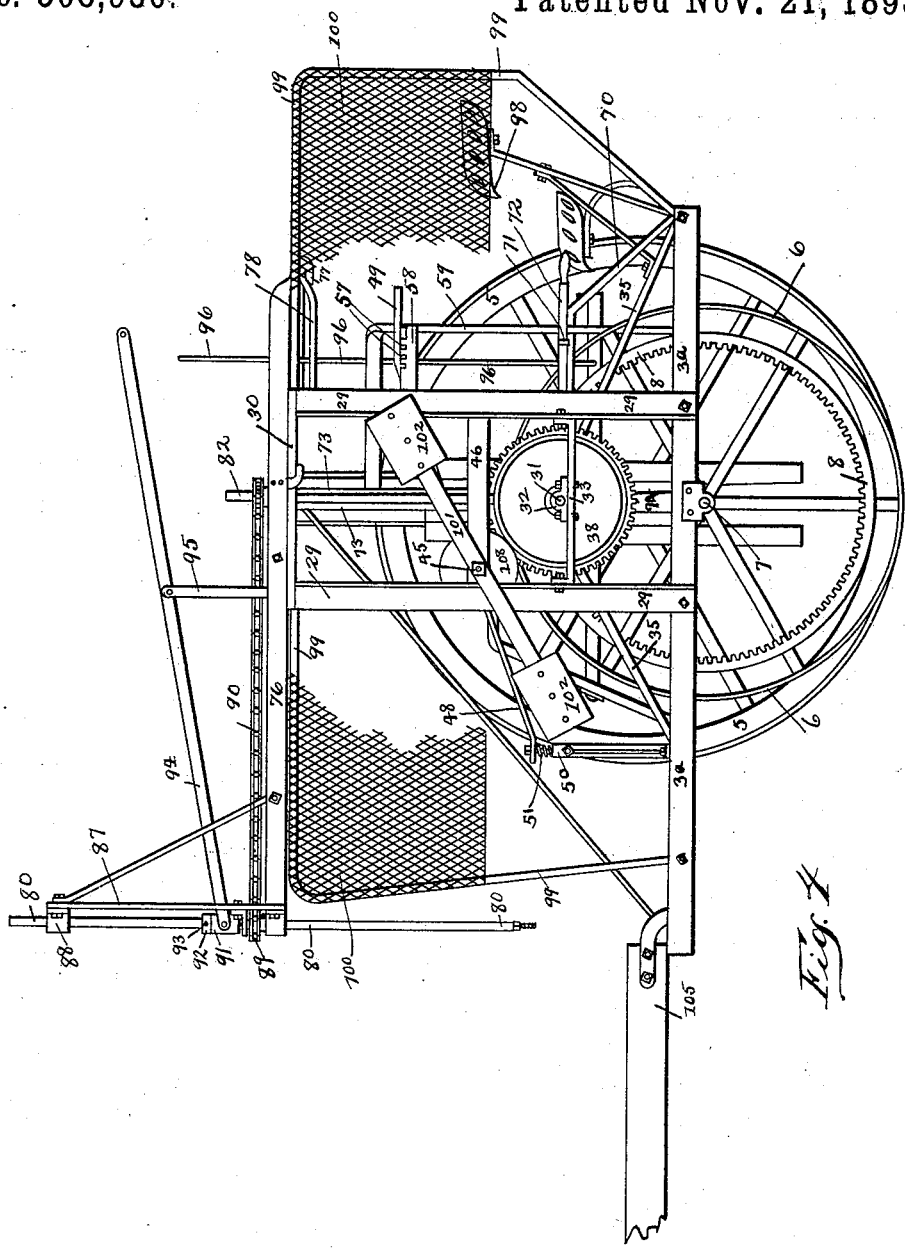

(No Model.) 5 Sheets—Sheet 4.
G. W. & C. E. GOSS.
HEDGE TRIMMING MACHINE.
No. 508,936. Patented Nov. 21, 1893.
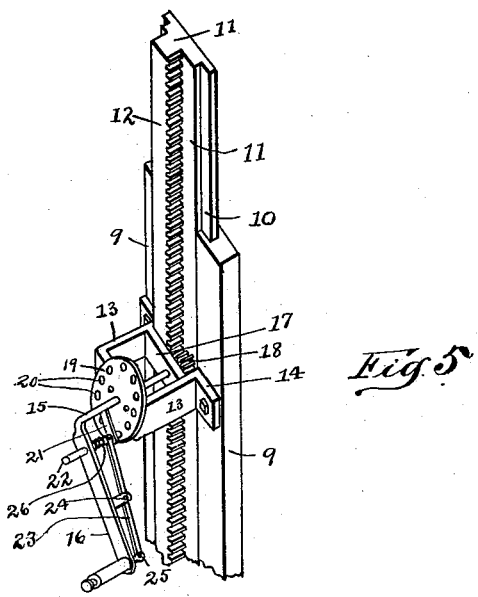
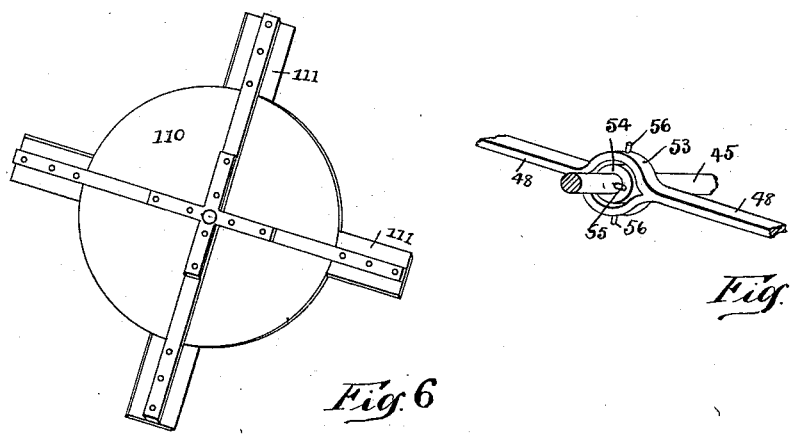
WITNESSES:
H. B. Bradshaw
A. L. Phelps
INVENTORS
George W. Goss
Charles E. Goss.
BY
Staley and Shepherd
ATTORNEYS.
THE NATIONAL LITHOGRAPHING COMPANY,
WASHINGTON, D. C.

(No Model.) 5 Sheets—Sheet 5.

G. W. & C. E. GOSS.
HEDGE TRIMMING MACHINE.

No. 508,936. Patented Nov. 21, 1893.

WITNESSES:
H. B. Bradshaw
A. L. Phelps

INVENTORS
George W. Goss
Charles E. Goss
BY
Staley and Shepherd
ATTORNEYS

United States Patent Office.

GEORGE W. GOSS AND CHARLES E. GOSS, OF KIRKERSVILLE, OHIO.

HEDGE-TRIMMING MACHINE.

SPECIFICATION forming part of Letters Patent No. 508,936, dated November 21, 1893.

Application filed April 8, 1893. Serial No. 469,537. (No model.)

*To all whom it may concern:*

Be it known that we, GEORGE W. GOSS and CHARLES E. GOSS, citizens of the United States, residing near Kirkersville, in the county of Licking and State of Ohio, have invented a certain new and useful Improvement in Hedge-Trimming Machines, of which the following is a specification.

Our invention relates to the improvement of hedge trimming machines of that class which are adapted for use in cutting or trimming hedge rows or fences.

The objects of our invention are to provide a hedge cutting machine of superior construction and arrangement of parts, by means of which hedges may be rapidly and regularly trimmed in a neat and uniform manner; to so construct our improved machine as to provide superior means for adjusting the cutters to varying heights and positions; to admit of the parts being so operated and set as to support the cutting arms at a uniform height when the machine is traveling over irregular ground surfaces and to produce other improvements which will be more specifically pointed our hereinafter. These objects we accomplish in the manner illustrated in the accompanying drawings, in which—

Figure 1 is a front elevation of our improved hedge cutting machine. Fig. 2 is a detail view in perspective of a portion of one of the cutter carrying shafts showing its connection with an adjusting arm. Fig. 3 is a side elevation of our improved machine. Fig. 4 is an opposite side view from that shown in Fig. 3. Fig. 5 is a view in perspective of a portion of the ground wheel adjusting rack and its operating mechanism. Fig. 6 is a plan view of a modified form of cutter. Fig. 7 is a detail view in perspective showing the connection of the horizontal cutter carrying shaft with an adjusting lever, and Fig. 8 is a detail plan view of a portion of the upper framework.

Similar numerals refer to similar parts throughout the several views.

2 represents a rectangular horizontal supporting frame consisting of the side beams 3 3ª and end beams 4 which are connected at desirable points by suitable cross frame pieces adapted to support and form connection for parts hereinafter described.

5 and 6 represent ground or bearing wheels of our improved machine. As shown in the drawings, the wheel 6 is mounted on a horizontal shaft 7, which is journaled in and near one side of the frame 2. This ground wheel 6 is formed as shown in the drawings, with an inner gearing 8. Secured to the outer side of one of the frame beams 3ª and extending upwardly therefrom in parallel alignment, are two guide arms 9 the inner faces of the latter being rabbeted to receive the projecting side tongues 10 of a vertical rack plate 11. This rack plate has formed on the central portion of its inner side and extending throughout the length thereof, a vertical rack 12, the teeth of which project at right angles with the inner face of said rack plate body. To the outer side or face of the rack plate 11 is fulcrumed or pivoted the ground wheel 5.

13 represents a bracket which as shown in the drawings, bridges the rack portion 12 of the plate 11 on the inner side thereof, said bracket being provided with feet 14 which are secured as shown, to the inner face of the guide arms 9. In this bracket is fulcrumed an inwardly extending crank shaft 15, the inner end portion of which is shaped to form a crank handle indicated at 16. The remaining end portion of the crank shaft 15 passes through and bears within a cross piece 17 of the bracket 13 and carries on its end a pinion 18 which as shown, engages with the teeth of the rack 12. Adjacent to the inner side of the bracket 13, the shaft 15 carries a stop disk 19, the latter being provided adjacent to its periphery with a circular row or ring of perforations 20. In front of the plate or disk 19, the shaft 15 is provided with a short projecting arm 21 which is parallel with the handle arm 16.

22 represents a catch pin which passes loosely through and connects said arms 21 and 16 and which has connected therewith between said arms, one end of a lever 23, the latter being fulcrumed near the center of its length to a projection on the handle portion 16, and also to the outer end of said handle piece, as indicated respectively at 24 and 25.

26 represents a coil spring which surrounds loosely the pin 22 and bears between the upper end of the lever 23 and the handle arm 16. As shown in the drawings, the pin 22 is so located as to have its inner end normally pressed by the spring 26 against the face of the disk 19, or within one of the pin holes 20 thereof.

29 represents two vertical parallel frame pieces which as shown in the drawings, rise from the lower frame beam 3$^a$ on opposite sides of the crank wheel shaft 7. These frame pieces 29 are connected at their upper ends by a cross plate 30.

31 represents a short transverse shaft, one end of which bears in a suitable boxing 32 located upon a cross piece 33 which connects the inner sides of the frame pieces 29 at points below the centers of the heights thereof. This shaft 31 has its inner portion bearing in a suitable boxing 34, at the junction of converging frame arms 35 which rise from the frame 2. The inner end of this shaft 31 carries a pinion 36 which projects within the ring gear 8 and engages with the teeth on the inner side thereof.

38 is a gear wheel which is carried upon the shaft 31, said gear wheel having formed on its outer side a suitable hub clutch 39. Within its bearing 32, said shaft 31 also carries thereon a bevel gear wheel 40, the latter having formed on its inner side a central clutch hub 41. Between these clutch hubs 39 and 41 the shaft 31 carries a double clutch 42, the notched ends of which are adapted as hereinafter described to engage with the notched ends of said clutch hubs. Journaled above and in front of the shaft 31 is a horizontal cutter shaft 45, the latter having one of its ends journaled in and passing through a cross piece 46 which connects the frame arms 29. The opposite end portion of the shaft 45 bears in a suitable boxing which is supported upon the upper horizontal portion of a frame arm 47 which rises from the frame 2.

48 represents an inclined adjusting lever, the horizontal upper end portion of which forms a suitable handle 49. The forward and lower end of this lever 48 is pivoted on the upper end of a vertical standard 50 which rises from the framework 2 between the forward portions of the frame arms 3$^a$ and 3. This pivoted end portion of the lever 48 is provided with a cushion seat consisting of a coil spring 51 which surrounds the upper end portion of said standard 50. Mounted and keyed to slide upon the shaft 45 is a pinion wheel 107, the latter having flanged sides as indicated at 108, said flanges preventing any disengagement of the wheel 107 with the wheel 38 with which it gears. Near the center of its length the lever 48 is enlarged and shaped to form a fulcrumed ring 53, the latter loosely surrounding a collar 54 which is loose on the shaft 45. This collar 54 is held against sliding on said shaft by suitable stop pins 55 which project from the shaft and the ring 53 is pivotally connected with the periphery of said collar by means of suitable pins 56. The upper and rear end handle portion 49 of the lever 48, is adapted as shown in the drawings to be retained within the desired one of a number of notches 57 formed in the upper side of a horizontal cross piece 58, the ends of the latter being connected with vertical frame pieces 59 and 60 which rise from the frame 2. As shown in the drawings, the frame standard 59 is provided on one of its outer sides with a series of notches 62.

63 represents a lever arm the forward end of which is pivotally connected at 64 with one of the downwardly extending lugs of the frame 47, the rear end portion of said lever arm being adapted to engage with the desired one of the notches 62 of the arm 59. The rearwardly projecting end of this lever arm 63 is provided with suitable stirrup 65.

Extending upwardly and forwardly from the rear end of the frame 2 and terminating in a horizontal upper end portion is a supporting arm or rest 70, the latter serving as a rest for a projecting lug 71 on a lever arm 72, the forward end of which is connected with the double clutch 42.

From the central portion of the frame 2 rises a standard 73, said standard having its upper portion provided with a lateral and thence upward bend as indicated at 74.

76 represents a horizontal and oblong frame the sides of which converge at one end and meeting terminate in a downturned hook 77. The side arms of this frame 76 are adapted to rest as shown upon the cross frame piece 30 which connects the frame standards 29. The hook termination 77 of said frame 76 is adapted to hook over or engage with a curved track plate 78, the latter having one of its ends connected with the upper end of the standard 73 and having its remaining end connected by an arm 79 with the upper portion of one of the standards 29.

The forward end portion of the frame 76 has journaled therein a vertical cutter carrying shaft 80, which is adjustably supported as hereinafter described.

From the frame cross piece 46 projects inwardly a suitable bearing block 81, through which passes a vertical shaft 82 on the lower end of which is carried a beveled pinion wheel 83 the teeth of which mesh with those of the beveled gear wheel 40. The upper end portion of the shaft 82 has a further bearing in a cross piece 84, which connects the side arms of the frame 76. Above this cross piece 84, said shaft 82 carries a sprocket wheel 85 having a hub 86 which bears upon the cross arm 84.

Rising from the forward end portions of the sides of the frame 76, are the vertical arms of a yoke frame 87 from the upper end of which is supported centrally a suitable half bearing box 88, within which the upper portion of the cutter carrying shaft 80 is adapted to rotate.

89 is a sprocket wheel which is keyed to slide on the shaft 80, said wheel being in horizontal alignment with the sprocket wheel 85 and connected with the latter by an endless chain 90. The shaft 80 also passes through an opening in a projecting guide or stop plate 103 on the frame 87, said stop plate being arranged above the sprocket wheel 89 and designed to prevent the latter rising with the shaft 80.

Between the upper and lower bearings of the shaft 80 said shaft is surrounded by a sleeve 91, the lower end of which abuts against one or more stop pins 92' projecting from said shaft. Resting upon the upper end of the sleeve 91 is a collar 92 which also surrounds said shaft and which is secured to the latter by means of a pin 93. To the sleeve 91 is fulcrumed the bifurcated end portion of an inwardly extending lever arm 94. This arm 94 is fulcrumed at about the center of its length between the upper ends of two upwardly extending and inwardly inclined arms 95 which are supported from the frame 76. The rear end of the lever arm 94 is jointedly connected with the upper end of a rod 96, the lower end of which is jointedly connected with the lever arm 63.

Supported from the framework at the rear end of the machine within reaching distance to the operating mechanism of the rack 11 is a suitable seat 97.

98 represents a second and preferably higher seat arranged on the opposite side of the machine in such position as to admit of its occupant controlling the operation of the levers 63, 48 and 72.

99 represents a screen frame the end portions of which as shown, rise from opposite end portions of the frame side 3ª and the upper half of which is covered by a suitable screen 100, a portion of the latter being broken away in Fig. 4 of the drawings, to admit of clearly illustrating the parts in rear thereof.

101 represents a cutter arm or bar, to the ends of which are secured suitably shaped knife plates 102. The central portion of this cutter bar is designed as shown in the drawings, to be connected with the lower end of the shaft 80, or with the outer end of the shaft 45 and made to rotate therewith. The forward end portion of the framework is provided as shown at 105 with a suitable tongue.

In order to illustrate the operation of our device, we will suppose that the parts of the machine are substantially in the positions shown in Figs. 1 and 3 of the drawings, that is, the cutter being detached from the horizontal shaft 45 and mounted on the lower end of the vertical shaft 80 and the frame 76 being so supported as to bring said cutter bar opposite one side of the machine. In order to trim the upper sides or tops of the hedge plants the machine is located to travel adjacent to and parallel with the hedge row, with said horizontal cutter bar transversely crossing the upper side of said row. The machine being in this position the occupant of the seat 98 may by an upward or downward adjustment of the lever 63 regulate the height of said cutter bar through the connection of the cutter bar shaft with said lever hereinbefore described. By throwing the clutch 42 into gear with the clutch 41, it will be seen that a gear connection between the shaft 31 and shaft 82 is produced which when said shaft is rotated as hereinafter described must produce a traveling motion of the sprocket chain 90 and a consequent rapid rotation of the cutter shaft 80. Motion is communicated to said shaft 31, as will readily be seen, by the traveling motion of the ground wheels 5 and 6, the pinion 37 of said shaft being driven by the teeth of the ring gear 8.

In order to retain the framework of the machine in the desired horizontal position and thus prevent any irregularity in the depth of cut produced by the horizontal cutter bar, the occupant of the seat 97 may by disengaging the pin 22 from the stop disk 19 and turning the crank arm 16, raise and lower the rack 11, thus allowing the ground wheel 5 to run in depressed or raised places and still admit of the machine frame retaining its normal position.

When it is desired to trim the side of a hedge the cutter bar may be attached to the outer projecting end of the horizontal shaft 45, thus arranging the cutters at right angles to their first described position. This change of cutter bars having been made the frame 76 may be swung to the front of the machine to the position shown in Fig. 4 of the drawings. This swinging movement of said frame is accomplished by first disengaging the rod 96 from the lever 94 and then forcing the frame 76 to the front, the hook 77 of said frame traveling against the under side of the track plate 78. In order to adjust the horizontal shaft 45 longitudinally the handle 49 of the lever 48 may be raised from its seat in one of the notches 57, when said lever may be forced in the desired direction to press the shaft 45 inward or outward as may be required. This shaft having been thus set in the desired position the lever handle may be reset in the desired one of the notches 57, where it will be retained by the action of the spring 51 on the lower end of said lever. In order to impart the desired rotary motion from the shaft 31 to the shaft 45, the lever 72 is so moved as to cause an engagement of the clutch 42 with the gear wheel clutch 39. Through the rotation of the gear wheel 38 thereby caused, motion is contributed to said shaft 45 through the pinion wheel 107.

As shown in Fig. 6 of the drawings, we may employ in place of the cutter bar 101 a disk 110, the latter being provided with radial projecting cutters on its periphery, such as are indicated at 111.

From the construction and operation herein shown and described, it will be seen that a machine is provided of superior construction and arrangement of parts, by means of which a hedge may be rapidly, neatly and uniformly trimmed. It will be observed that means are provided for regulating the depth of the cut of the knives, thus admitting of trimming the hedges to any desired depth.

The screen which we have shown and described will serve to prevent the cuttings from being thrown on to the machine and operators and thus preventing the parts of said machine from being clogged with such cuttings.

Having now fully described our invention, what we claim, and desire to secure by Letters Patent, is—

1. In a hedge trimming machine the combination of the frame and ground wheels, a shaft 45 journaled and sliding in said framework and projecting from one side thereof, a shaft 31 driven from one of said ground wheels, a gear connection between said shafts and a cutter bar adapted to be supported on said shaft 45, substantially as specified.

2. In a hedge trimming machine the combination of the framework and ground wheels, one of said ground wheels incasing a ring gear wheel as described, a shaft 31 journaled in said framework, a pinion on said shaft engaging with said ring gear wheel, a shaft 45 having rotary and sliding bearings in said framework, a gear wheel on said shaft 31 meshing with a wheel 107 keyed to slide on shaft 45, a lever 48 jointedly connected with said shaft 45, one end of said lever having a pivotal connection with a frame arm and resting upon a coil spring on said arm, a notched bar 58 with which the remaining end of said lever is adapted to engage, and a knife carrying bar on the outer end of said shaft 45, substantially as specified.

3. In a hedge trimming machine the combination of the frame and ground wheels, a shaft 31 journaled in said framework and having a gear connection with one of said ground wheels a beveled wheel 40 on said shaft 31, a vertical shaft 82 journaled in said framework, a beveled pinion on said shaft meshing with said wheel 40, a sprocket wheel on the upper end of said shaft 82, an oblong frame 76 supported and projecting from the upper portion of said framework, a vertical shaft 80 journaled in said projecting frame, a sprocket wheel keyed to slide on said shaft, a chain connecting said sprocket wheels, a knife carrying bar adapted to be secured to said shaft 80 and means for supporting said shaft 80 at different heights substantially as specified.

4. In a hedge trimming machine the combination of the framework and ground wheels, a vertical shaft 82 journaled therein, a gear connection between said shaft 82 and one of said ground wheels, an oblong frame 76 supported and projecting from the upper portion of said framework, a vertical shaft 80 journaled and adapted to slide in said projecting frame, a gear connection between said shafts 82 and 80, a cutter bar adapted to be carried by said shaft 80, a lever 94 fulcrumed to said frame 76 and said shaft 80 as described, a lever 63 fulcrumed at one end to the framework of said machine and adapted to engage at its remaining end with stop notches on one of said frame arms and a rod 96 jointedly connecting said levers 63 and 94 substantially as specified.

5. In a hedge trimming machine the combination of the framework and ground wheels, a shaft 31 journaled in said framework and adapted to be rotated from one of said ground wheels, a gear wheel 38 and beveled wheel 40 loose on said shaft 31, and having clutch hubs 41 and 39, a clutch 42 keyed to slide on said shaft 31 between said gear wheels, a horizontal knife carrying shaft 45 journaled above said shaft 31, a gear wheel thereon meshing with the wheel 38, a vertical shaft 82 journaled in said framework and having a gear connection with said beveled wheel 40, a projecting frame portion 76 on the outer side of said machine frame, a vertical cutter carrying shaft journaled in said projecting frame, and a gear connection between said cutter shaft and shaft 82 substantially as specified.

6. In a hedge trimming machine the combination with the framework and ground wheels thereof, a vertical shaft 82 journaled in said framework and adapted to be operated by the rotation of one of said ground wheels, a horizontal curved track plate supported from the upper portion of said framework, an oblong frame 76 having a hook shaped end engaging with said track plate, said frame 76 projecting outward from said machine, a vertical cutter carrying shaft journaled as described in the outer projecting end portion of said frame 76 and a gear connection between said cutter carrying shaft and shaft 82 substantially as and for the purpose specified.

GEORGE W. GOSS.
CHARLES E. GOSS.

In presence of—
BARTON GRIFFITH,
C. C. SHEPHERD.